United States Patent Office 3,465,225
Patented Sept. 2, 1969

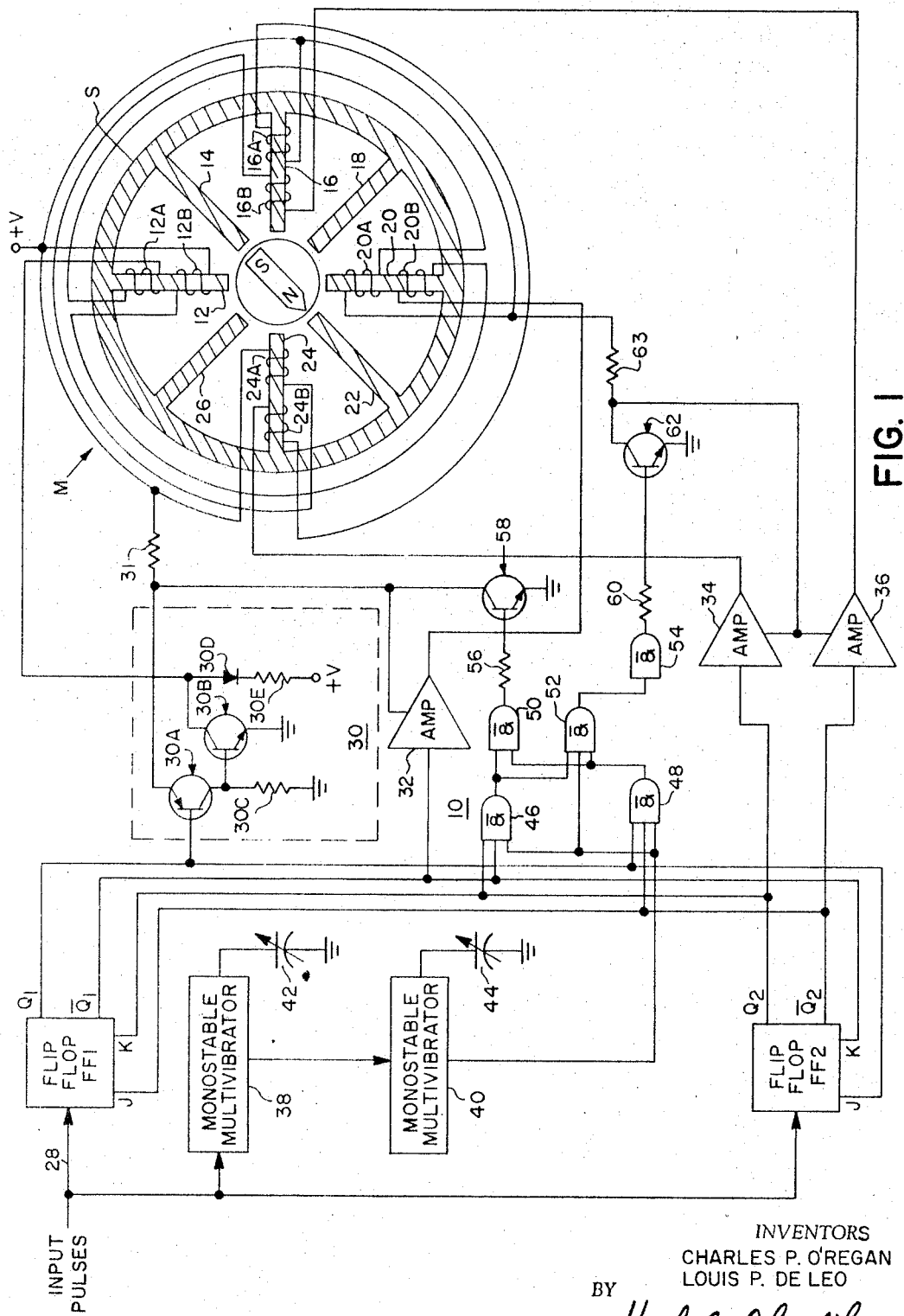

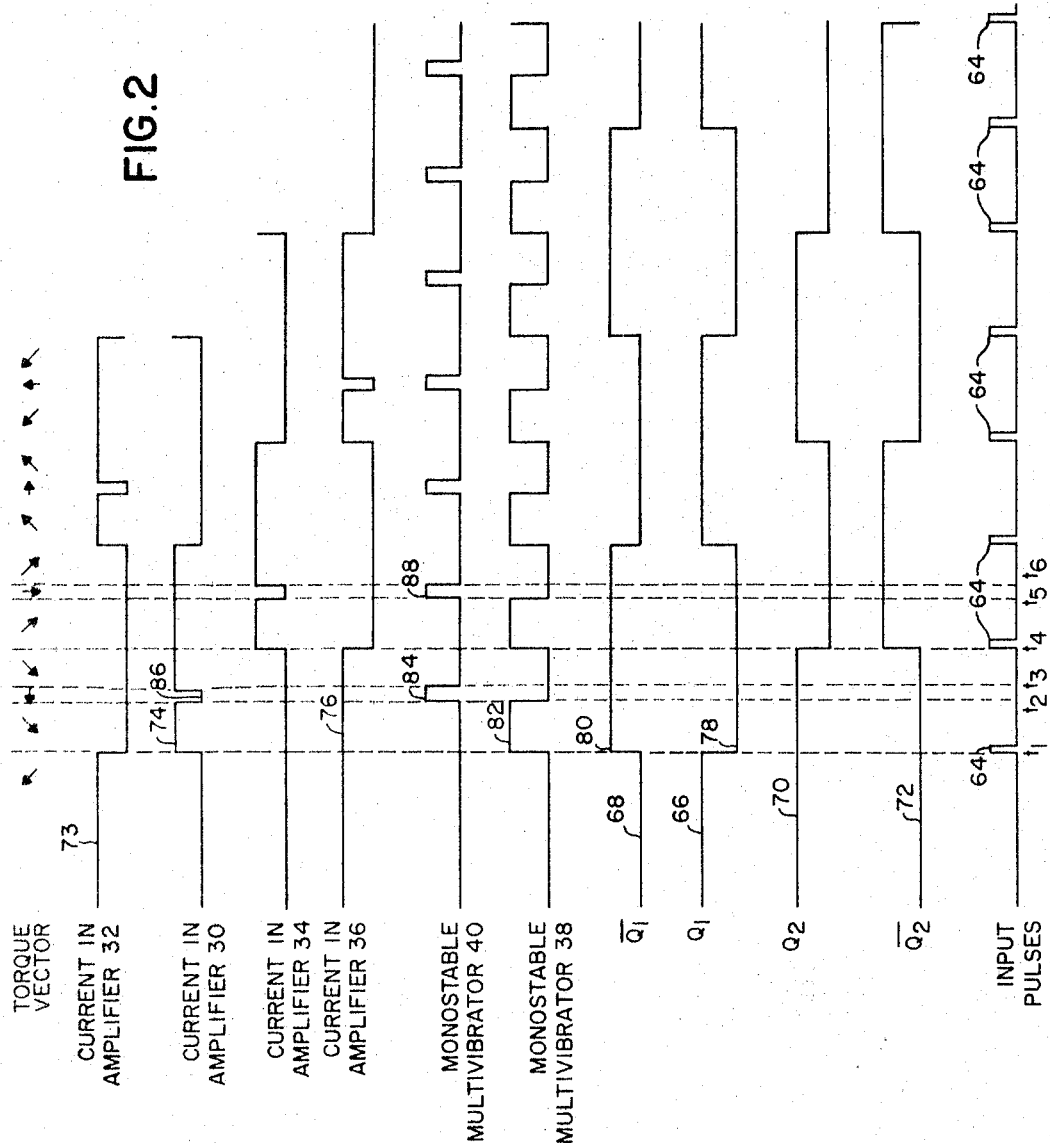

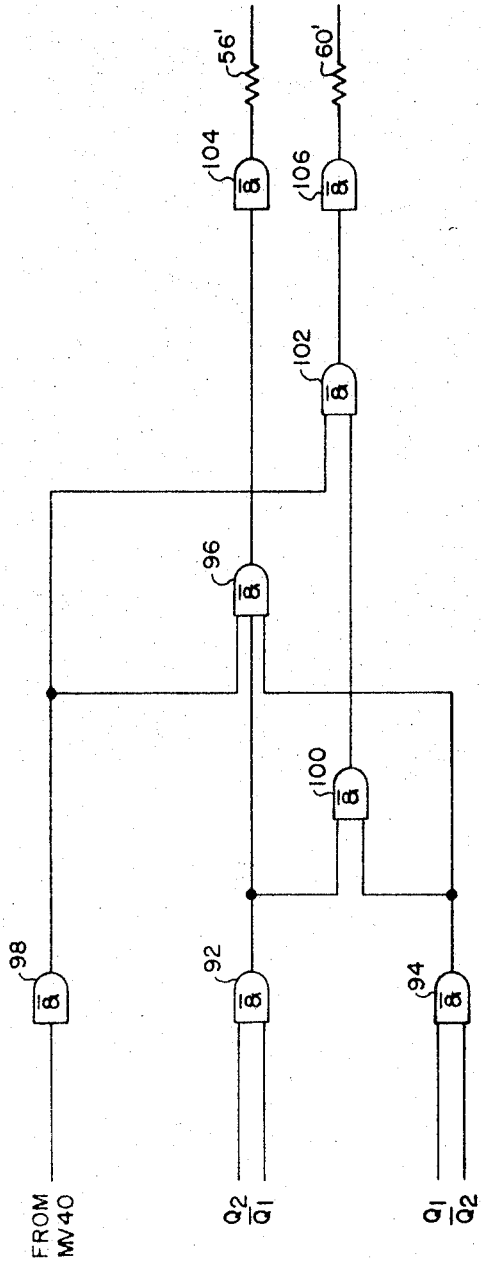

3,465,225
STEPPER MOTOR DAMPING CIRCUIT
Charles P. O'Regan, Bronx, N.Y., and Louis P. DeLeo, Totowa Borough, N.J., assignors to Singer-General Precision, Inc., a corporation of Delaware
Filed Dec. 6, 1966, Ser. No. 599,421
Int. Cl. H02p 1/54, 5/46
U.S. Cl. 318—138                                         1 Claim

ABSTRACT OF THE DISCLOSURE

In stepper motors, the overshoot and oscillation of a rotor with respect to its destination step position is prevented by applying a retarding torque to the rotor during an interval of time intermediate to its acceleration from one step to the next. This intermediate retardation is controllable in timing and duration so that the rotor moves quickly between steps but arrives at its destination with low energy and momentum and overshoot and oscillation are virtually prevented. Common stepper motors having magnetized rotors and stator windings energizable individually or in pairs to produce radial magnetic fields through the rotor are operable in accordance with different embodiments of the invention by energizing one or a pair of windings to provide accelerating torque. For applying the retarding torque in the first embodiment, a second winding is also energized and in the second embodiment one of the energized windings is de-energized. In each case, a retarding field nonaligned with the rotor field is produced.

---

This invention relates to control circuitry and, more particularly, to the damping of the rotation of a rotor of a stepper motor.

In stepper motors of the type wherein a stator is provided with a plurality of inwardly directed poles, corresponding electrical windings about the poles, and wherein the windings are energizable in certain combinations by pulsed potentials to cause a rotor to rotate in discrete increments or steps, a common difficulty is the tendency of the rotor to overshoot in the stepping operation. The rotor acquires sufficient energy and momentum to overshoot the end of the step in the stepping operation and to oscillate about this end position.

It has been proposed to overcome this difficulty by providing a rotary mechanical damper or system employing some damping means for the rotor. While this approach has been successful in the sense that the overshooting of the rotor is minimized, it has been deficient and undesirable in that the coupling to the motor shaft of an external inertia load often exceeds the load of the intended application of the motor and contributes more to motor instability and slower response than the load itself. In addition, the added weight, power requirements, package size, and overall cost, when associated components required by such damping means are considered, are undesirable factors of such prior systems. Also, such prior art means for providing damping of stepper motor rotors have a limited range of application to a wide variety of speed and load situations.

In accordance with this invention, the damping of a motor of a stepper motor is provided by a novel method and means for applying a reverse torque to the rotor during an interval of time intermediate to the pulsing period during which a forward torque is applied. More specifically, for advancing from one step to the next, a forward torque is applied by an appropriate first condition of excitation to the stator windings of the motor. The excitation of any individual winding may be full energization so as to produce a magnetic field or no energization at all whereby no magnetic field is produced. In one embodiment, the first condition of excitation is full energization of two adjacent windings and in the other embodiment, the first condition is full energization of one winding and absence of energization of the others. The first condition of excitation in either case produces a forward torque on the rotor assuming its magneitc vector to be nonaligned with the field produced by the excitation of windings and at a previous step position. After a first predetermined interval of time under the first condition of excitation, during which the rotor acquires a certain momentum in advancing toward its next step position, a second condition of excitation which has the effect of retarding the forward motion of the rotor is established. In the one embodiment, the second condition of excitation is de-energization of one of the windings and continued full energization of the other winding while in the other embodiment, the second condition of excitation, is full energization of both windings. In either case, the timing of establishment of such second condition is such that the field produced by the winding or windings energized is nonaligned with the rotor magnetic vector and such as to decelerate the rotor. The spatial position of the rotor at the time of application of such reverse torque and the duration of application of such reverse torque are controllable to achieve an optimum condition in which the motion of the rotor is reduced considerably after its initial acceleration, due consideration being given to the rotor moment of inertia, load on the rotor and other factors, whereby upon re-application of a forward torque results in a gradual completion of the step increment. Thus, after the interval of the second condition of excitation, the original or first condition of excitation is re-established. In this manner, the rotor moves quickly to an intermediate position of the step, is slowed by the reverse torque and then moves relatively gently to its final position without great momentum. Overshoot and oscillation is insignificant. In accordance with this invention, the heavy, bulky, expensive external, inertia damping apparatus is obviated; and in lieu thereof a relatively simple, inexpensive, light, and small electronic circuit is provided which effects damping over an unlimited range of applications and without interfering effects.

Accordingly, it is a principle object of this invention to facilitate the damping of a stepper motor rotor by a method and means which are simple, inexpensive, light, small, and effective over a large range of applications.

It is another object of this invention to facilitate stepper motor rotor damping by a method and means having low power requirements.

It is another object of this invention to facilitate a method and means of stepper motor rotor damping by means which are readily controllable in accordance with the requirements of a particular application.

Other objects and many additional advantages will be more readily understood by those skilled in the art after a detailed consideration of the following specification taken with the accompanying drawings wherein:

FIGURE 1 is a schematic block diagram showing a circuit for facilitating the damping of the stepper motor rotor in accordance with this invention, FIGURE 2 is a timing chart illustrating the condition of various components of the circuit of FIGURE 1 at different instants of time during which damping of a rotor of a stepper motor is effected, and FIGURE 3 shows logic circuitry which may be substituted in the circuit of FIGURE 1 according to modification of this circuit.

Referring now more particularly to the drawings for a more detailed description of the invention, in FIGURE 1, 10 represents generally the motor control circuit operable to control the operation of a stepper motor shown generally at M. The stepper motor, M, is of a typical type having a stator, S, made of soft iron providing a good magnetic path and eight inwardly directed poles designated 12, 14, 16, 18, 20, 22, 24, and 26. Alternate poles 12, 16, 20 and 24 are provided with magnetizing windings while the alternate poles 14 18, 22, and 26 are free of such windings and provide a magnetic path to the flux generated. The magnetic flux produced by the stator windings passes through the rotor, R, of the motor, M, and is produced by complementary windings on oppositely disposed poles. More specifically, to produce a magnetic flux through the rotor, R, from pole 12 to pole 20, a first winding 12A on pole 12 and a second winding 20A on pole 20 are connected in series and provide additive magnetic fields so as to pass flux through the poles, air gaps and through the rotor, R. For producing a flux through rotor, R, in a direction from pole 20 to pole 12, that is, in a direction opposite to that produced by the windings 12A and 20A, the poles 12 and 20 are provided with a second set of windings 12B, 20B connected in series and wound in such a direction that current passed through the windings 20B and 12B is effective to produce such oppositely directed flux. In an entirely similar manner, the poles 16 and 24 are provided with respective pairs of windings 16A–24A and 16B–24B for establishing magnetic flux fields through the rotor, R, in mutually opposite directions.

While the sets of windings 12A–20A, 12B–20B, 16A–24B and 16B–24A each comprise two separate and discrete windings, each on a different stator pole, for purposes of simplicity and brevity in explanation herein, these sets of windings are regarded as a single winding. Each set of these windings is connected in series whereby the same energizing current passes through each and the sense of the windings is such that each winding of the pair produces a magnetic field in the same direction. A single one of each pair of windings would respond to the same current to produce a magnetic field in the same direction as does the pair, however, the second winding of the pair facilitates a more balanced, orderly magnetic field in stator, S, and through rotor, R.

The rotor, R, of motor, M, is magnetized along a diameter so as to provide an effective magnet as shown by the arrow extending diametrically through the rotor and in response to the energization of sets of coils on the stator as hereinabove described, a rotor is orientable or rotatable so as to align the magnet of the rotor with the field produced by the stator windings. Also, in response to the energization of two sets of adjacent windings such as a first set 12A–20A and 16A–24A, a resultant magnetic field between the poles 12 and 16 for example is produced whereby the resultant field is most intense along the winding-free poles 14 and 22. Thus, the rotor, R, would orient so as to bring the magnetized diameter of the rotor in alignment with the poles 14 and 22.

The circuit 10 of FIGURE 1 includes a pair of flip-flop circuits FF1 and FF2, which are bistable and in an electrically energized condition of each circuit, each is capable of assuming two different states of equilibrium. In one of the states of equilibrium, first outputs designated $Q_1$ and $Q_2$, respectively, are true; and in an alternate condition of the circuits, second outputs $\overline{Q_1}$ and $\overline{Q_2}$ are in a true condition. The two outputs of each circuit are thus complements of each other, that is, in the condition of the circuit wherein one of the outputs is true, the other is necessarily false.

Input pulses which initiate a sequence of steps resulting in stepping of the motor, M, are applied to both of the flip-flop circuits FF1 and FF2 on an input line 28. These input pulses are effective under proper conditioning of the circuits FF1 or FF2 to cause the circuits to change their states of equilibrium. Conditioning of the respective flip-flop circuits is achieved by appropriate conditioning potentials applied to J and K inputs to the flip-flops. It is noted that the respective outputs $Q_1$ and $\overline{Q_1}$ of circuit FF1 are connected to respective conditioning inputs J and K of flip-flop circuit FF2 and outputs $Q_2$ and $\overline{Q_2}$ of flip-flop circuit FF2 are connected, respectively, to inputs K and J of flip-flop circuit FF1.

The stepping sequence of the flip-flops FF1 and FF2 is in accordance with the following truth table,

|  | $Q_1$ | $\overline{Q_1}$ | $Q_2$ | $\overline{Q_2}$ |
| --- | --- | --- | --- | --- |
| Input pulse: |  |  |  |  |
|  | 1 | 0 | 0 | 1 |
| 1 | 0 | 1 | 0 | 1 |
| 2 | 0 | 1 | 1 | 0 |
| 3 | 1 | 0 | 1 | 0 |
| 4 | 1 | 0 | 0 | 1 |
| 5 | 0 | 1 | 0 | 1 | wherein it is observed that the complete stepping sequence occurs every four steps initiated by four input pulses.

The outputs $Q_1$ and $\overline{Q_1}$ of flip-flop circuit FF1 are applied to the inputs of respective amplifiers 30 and 32 and the outputs $Q_2$ and $\overline{Q_2}$ of flip-flop circuit FF2 are applied to the inputs of respective amplifiers 34 and 36. The outputs of these amplifiers are applied directly to one end of respective stator windings 12A, 20B, 24B, and 16B selectively providing ground paths for currents flowing in these windings produced by a source of potential, +V, applied to the other ends of these windings.

The amplifiers 30, 32, 34, and 36 are of identical construction and thus, for brevity and simplicity the details of only one of these amplifiers, amplifier 30, is shown and described in detail.

Amplifier 30 includes a transistor 30A and the $Q_1$ of flip-flop circuit FF1 is applied to the base of transistor 30A. The emitter electrode of transistor 30A is connected through a resistor 31 to the source of positive potential designated +V. The collector electrode of transistor 30A is connected to the base of a transistor 30B and also through a resistor 30C to ground.

The emitter of transistor 30B is grounded and the collector of this transistor is connected to the anode of a diode 30D, the cathode of which is connected through a resistor 30E to the source of positive potential, +V. The diode 30D is poled to pass positive spikes appearing at this collector electrode to provide noise suppression. The collector of transistor 30B is also connected to one end of winding 12A to provide a return path for currents flowing from source, +V, through this winding. Thus, the transistors 30A and 30B are connected so as to form an effective Darlington pair amplifier.

In the absence of any other influence, the amplifier 30 is responsive to a ground potential signal from the output $Q_1$ of flip-flop circuit FF1 to produce conduction in the transistor 30A which in turn initiates conduction in transistor 30B, providing a low resistance path to ground for the end of winding 12A to which the collector of transistor 30B is connected. Thus, in this circumstance, current flow exists from the source +V through the winding 20A then, through the winding 12A and through transistor 30B from collector to emitter and to ground. A similar current path exists from the source, +V, through other windings of the stator, S, and through the corresponding transistor circuitry of the amplifiers 32, 34, and 36.

For controlling the application of current return paths by the amplifiers 30 through 36, circuitry including a pair of monostable multivibrators 38 and 40 is provided. Each of these circuits is of the type responsive to a single input pulse of appropriate polarity and short duration to produce an output pulse of a predetermined interval and then to return to its initial state. The multivibrator circuit 38 is provided with a variable capacitor 42 which is effective to control the pulse width of the output pulse produced by this multivibrator according to the demands of the particular application of the circuit 10. The second monostable multivibrator circuit 40 has its input connected to the output of the multivibrator circuit 38 and is similarly responsive to a single input pulse to produce an output pulse of a time duration dependent upon the value of a variable capacitor 44.

The multivibrator circuit 38 is responsive to the leading edge of the input pulses applied to input lines 28 to initiate a change in state of the multivibrator and the multivibrator circuit 40 is responsive to the trailing edge of the output pulse produced by the multivibrator circuit 38 to initiate a change in state thereof. Co-operative with the flip-flop circuits FF1 and FF2 and the multivibrator circuits 38 and 40 are NAND logic gates 46, 48, 50, 52, and 54, each of which is capable of performing the NOT AND function and has output potentials of substantially zero or some positive value. Stated otherwise, each of these circuits is responsive to true inputs on all of its input lines to produce a false output and responsive to a false input on any one or more of its input lines to produce a true output. The NAND gate 46 has three inputs to which are applied, respectively, the outputs $Q_2$, $\overline{Q_1}$, and MV40, the latter representing the output of monostable multivibrator 40 and the NAND gate 48 has three inputs to which are applied, respectively, the outputs $Q_1$, $\overline{Q_2}$ and MV40, the latter representing the output of monostable multivibrator circuit 40. The outputs of these NAND gates 46 and 48, are applied to the respective inputs of NAND gate 50 and the output of these gates 46 and 48, together with the output of monostable multivibrator circuit 40, are applied to the three respective inputs of the circuit 40, are applied to the three respective inputs of the NAND gate 52. The output of the NAND gate 52 is applied to the single input of the NAND gate 54 which operates simply to invert its input. The output of NAND gate 50 is applied through a resistor 56 to the base of an NPN type transistor 58 and similarly, the output of NAND gate 54 is applied through a resistor 60 to the base of an NPN type transistor 62. The collector of transistor 62 is connected to potential source +V through a resistor 63. The emitters of transistors 58 and 62 are each connected to ground and the collector of transistor 58 is connected to the emitter of transistor 32A.

In response to positive signals applied to the base of transistor 58, the transistor is rendered conducting providing a very low resistance path between its collector and emitter which is grounded and thus, provides an effective ground to the emitter terminal of transistor 30A. Accordingly, the transistor 30A under such circumstances is deprived of a source of operating current and thus, the transistor 30A is insensitive to control potential applied from the output $Q_1$. Accordingly, transistor 30B is rendered nonconductive and thus, the return path for the energizing current in the stator windings 12A and 20A is interrupted and the current in these windings is dropped to zero.

The manner in which the monostable multivibrators 38 and 40 and the logic circuitry including the NAND gates 46, 48, 50, 52, and 54 and cut off transistors 58 and 62 operate to control the torque applied to the rotor, R, of the motor, M, may better be understood by reference to FIGURE 2 of the drawings along with FIGURE 1. In FIGURE 2, the pulses which initiate the separate steps of rotation of the rotor, R, are designated at 64 and as shown in this specific embodiment, occur at regularly timed intervals. It is to be observed, however, that this regular timing is not a necessary requirement and that the presentation of such pulses may be at different intervals of time and that the motor under such circumstances would advance only in response to an incoming pulse irrespective of its time occurrence.

It is assumed that prior to some time, designated $t_1$, the condition of the circuit 10 is such that all energizing potentials are applied thereto and that the state of flip-flop circuit FF1 is such that the output $Q_1$ is true, the output $\overline{Q_1}$ is therefore false as represented at 66 and 68, respectively in FIGURE 2, and that the condition of flip-flop circuit FF2 is such that output $Q_2$ is true and that the output of $\overline{Q_2}$ is false as shown at 70 and 72, respectively, in FIGURE 2. Also at such time prior to time $t_1$, the amplifiers 32 and 36 are conditioned such as to provide return paths for the windings 12B–20B and 16B–24A and current flows as represented at 73 and 76 in FIGURE 2. In these circumstances, the resultant magnetic field vector produced by the stator windings is as shown in the upper row of FIGURE 2 at this time, whereby the rotor, R, is in alignment with poles 18 and 26 as shown in FIGURE 1 of the drawings. The intensity of such field is the vector addition of the fields produced by separate windings, namely, $\sqrt{2}$ times the field intensity of one winding alone.

In response to the first input pulse 64, at time $t_1$, the flip-flop circuit FF1 changes state whereby the output $Q_1$ becomes false as shown at 78 and the output $\overline{Q_1}$ becomes true as shown at 80. During this same time, the flip-flop circuit FF2 remains in the state assumed just prior to time $t_1$. Also, in response to the first input pulse 64, the monostable multivibrator circuit 38 is caused to produce an output pulse as shown at 82. During the interval of time beginning with $t_1$, the amplifiers 30 and 36 provide ground return paths for the winding pairs 12A–20A and 16B–24A, respectively, whereby the resultant magnetic field produced by the stator windings is such as to produce a resultant vector of field in alignment with the poles 14 and 22 and as shown in FIGURE 2. As a consequence, a counterclockwise rotating torque is applied to the rotor tending to bring the field of the rotor in alignment with the resultant field produced along the poles 14 and 22. During the interval of time from $t_1$ to $t_2$ during which the potential pulse 82 from the output of monostable multivibrator 38 appears, the rotor R gathers energy and momentum and rotates counterclockwise in FIGURE 1. The operation is controlled so that the rotor, R, at time $t_2$, has rotated to an angular position wherein the magnetized diameter is beyond poles 16–24, that is, it is angularly counterclockwise of these poles.

At time $t_2$, the trailing edge of the pulse 82 initiates the operation of monostable multivibrator 40 whereby it produces an output pulse 84 having a leading edge at time $t_2$. During the pulse 84, i.e., the interval of time from $t_2$ to time $t_3$, the latter time being the instant of termination of the pulse 84, the NAND gate 46, has a false output since the inputs $\overline{Q_1}$, $Q_2$ and MV40 to this NAND gate 46 are true producing a false output which is applied to the input of the NAND gate 50. The NAND gate 50 therefore produces a true output which applies a positive potential to the base of transistor 58, rendering the transistor conductive. At this time interval, since the output of NAND gate 46 is applied as an input to NAND gate 52, the output of gate 54 is false whereby transistor 62 is maintained nonconducting. The conductive condition of transistor 58 places a very low resistance path between the emitter of transistor 30A and ground whereby conduction through this latter transistor and its counterpart in amplifier 32 is reduced to a very low value, reducing the positive potential drop across resistor 30C and the positive potential applied to the base of transistor 30B. Transistor 30B and its counterpart in amplifier 32 become cut off, interrupting the path to ground for the windings 12A–20A. As shown at 86 in FIGURE 2, the current in amplifiers 30, and in windings 12A–20A drops to zero and the current in windings 16B–24A is maintained whereby the flux vector is as shown for this time interval in FIGURE 2 and the flux in motor, M, is in alignment with poles 16 and 24. The vector representing such field is shown as being approximately .7 as long as the vectors representing fields produced as a resultant of two sets of field windings.

The field produced by a single set of windings as just described has the effect of applying a reverse torque to the rotor, R, because the rotor prior to the application of the single flux has moved from a position as shown in FIGURE 2, counterclockwise to a position counterclockwise of alignment with the poles 16 and 24. As a result, the angular velocity of the rotor, R, is diminished during the interval of pulse 84 and the energy and momentum of the rotor, R, are also consequently reduced.

After time $t_3$, the monostable multivibrator 40 returns to its initial quiescent state whereby the output of this multivibrator is reduced to zero and the conditions of circuit 10 return to a condition of current conduction in amplifiers 30 and 36 producing again, a counterclockwise rotating torque on the rotor, R, in a manner described hereinabove. This torque persists until the rotor, R, is brought into alignment with the poles 14 and 22 along which the resultant magnetic field is directed. Thus, the stepping of the rotor from a position in alignment with the poles 18 and 26 to the next forward position of alignment with the poles 14 and 22 is completed.

It is to be noted that in accordance with an important feature of this invention, the time during which the initial counterclockwise torque is applied to rotor, R, may be controlled by the duration of output pulse 82 of monostable multivibrator 38 and the time duration during which such reverse torque is applied may be controlled by the time duration of the pulse 84 of monostable multivibrator 40. Thus, depending upon the particular circumstances and the adaptations of the motor, these factors may be controlled to provide a substantially overshoot-free and oscillation-free stepping of the rotor, R.

It is to be noted that in response to the next input pulse 64 applied at time $t_4$ to the input of the flip-flop circuits and monostable multivibrator 38, a sequence of steps similar to those described hereinabove occurs whereby the rotor is advanced to a position of alignment with the poles 18 and 26. In this case, however, the flip-flop circuit FF2 changes state at time $t_4$ rendering the amplifiers 30 and 34 conductive so as to provide paths to ground for the appropriate windings of the stator of the motor and during an interval of time from $t_5$ to $t_6$, monostable multivibrator 40 provides an output pulse 88 rendering the transistor 62 conductive, cutting off the current flow through amplifier 34. Accordingly, a reverse torque is applied to the rotor during this interval in a manner similar to that described hereinabove reducing the rotation speed of the rotor and after the passage of pulse 88, the forward driving torque is reapplied to the rotor after which it is brought into alignment with poles 14 and 22.

As the input pulses 64 are sequentially applied, the rotor, R, progresses step by step in the manner described and the operations of the components of circuit 10 are as represented in FIGURE 2. The magnetic fields influencing movement of the rotor progress as shown in the upper row of FIGURE 2.

It is to be understood that the novel operation of a motor by alternately accelerating, retarding, and lastly, again accelerating the rotor may be performed in ways other than that described hereinbefore. Thus, in accordance with another embodiment of the invention, the motor, M, may be operated by applying energization potential to only one of the windings to provide an initial forward torque on the rotor maintaining such energization while energizing a second winding to produce a retarding torque on the rotor after it has passed an angular position of alignment between rotor field and stator winding field and finally, de-energizing the second winding to reapply the forward torque. This method is performed by a circuit similar to the circuitry of FIGURE 1 of the drawings, modified as indicated in FIGURE 3 of the drawings.

In FIGURE 3 NAND gates 92 through 106 are provided in lieu of the NAND gates 46 through 54 in FIGURE 1. NAND gate 92 is provided with a pair of inputs to which are coupled the outputs $\overline{Q_1}$ and $Q_2$ and NAND gate 94 is provided with a pair of inputs to which are coupled the outputs $Q_1$ and $Q_2$. The outputs of these NAND gates are coupled respectively to two inputs of a NAND gate 96. A third input to NAND gate 96 is derived from the output of a NAND gate 98 having the output of multivibrator 40 applied to its input. The outputs of NAND gates 92 and 94 are further coupled to the respective inputs of a NAND gate 100. A NAND gate 102 has its two inputs coupled to the outputs of NAND gates 98 and 100. The outputs of NAND gates 96 and 102 are coupled to the single inputs of respective NAND gates 104 and 106, the outputs of which are connected to resistors 56' and 60', corresponding to resistors 56 and 60 of circuit 10.

In the circuit modified in accordance with the showing in FIGURE 3, at the beginning of any step interval initiated by an input pulse, the respective conditions of flip-flop circuits FF1, FF2, and monostable multivibrator 40 condition the amplifiers corresponding to amplifiers 30 through 34 in such a manner as to establish a return circuit for only one of the windings of motor, M. To accomplish this result, one of the transistors corresponding to 58 and 62 is rendered nonconductive and the other is rendered conductive. During an interval in which these conditions prevail, the rotor, R, is accelerated. Thereafter, in response to the termination of the pulse of multivibrator 38, the inverted output of multivibrator 40 establishes a condition in which a transistor corresponding to tranistor 62 becomes nonconductive, rendering amplifiers such as 34 and 36 operative under the influence of flip-flop circuits FF1 and FF2 and establishing an energizing current in a second winding of the motor. The windings are wound in such a sense as to establish a retarding torque on the rotor for the duration of the inverted pulse from multivibrator 40 and after the passage of this pulse, the transistor corresponding to transistor 62 is rendered conductive, disabling the amplifiers such as 34 and 36. Thus, the second energizing winding is deenergized and the rotor is again accelerated to complete its step. In a manner similar to that described with respect to circuit 10, the retardation or damping is effective to reduce the rotor speed to such a value that upon completion of the step, the overshoot and oscillation of the rotor are both so low as to be insignificant.

Thus, the novel concept herein is to apply for a brief period in the stepping action, a reverse torque to the rotor and this concept is applicable irrespective of the number of poles and windings and irrespective of the number of phases of the motor. Accordingly, three- and four-phase windings, variable reluctance, permanent magnet and hybrid rotor configurations as well as two-phase permanent magnet motors may employ the present invention.

While the present invention has been described in preferred embodiments, it will be obvious to those skilled in the art that various modifications can be made therein within the scope of the invention, and it is intended that the appended claim covers all such modifications.

What is claimed is:

1. A control circuit for a stepper motor having a plurality of field windings energizable in adjacent pairs to produce magnetic field components having resultant magnetic fields for producing a sequence of energizations during each step or increment, comprising: a first monostable multivibrator means for determining one predetermined interval of time, a circuit including said first multivibrator means and said windings for energizing an adjacent pair of said windings for said one predetermined interval of time so as to produce magnetic field components in two directions and a resultant field in a direction intermediate to said two directions, a second monostable multivibrator means for determining a second predetermined time interval shorter than said first time interval, also in said circuit for de-energizing one of said windings and maintaining energization of the other of said windings for a second interval of time to produce a component magnetic field in one of said two directions and means for re-energizing said de-energized winding following said second interval to re-establish said resultant magnetic field, a pair of flip-flops and gating means in said circuit for selectively completing and interrupting said circuit to said windings, gate controlling means on said flip-flops effective to apply controlling potentials to combinations of said gating means and being responsive to said flip-flops and said flip-flops in turn being responsive to pulse inputs to alter said combinations in a predetermined order, amplifier means for producing a control potential during said second predetermined time interval for de-energizing one of said windings for said time interval, disabling means for disabling the gating means in the energization circuit of one of said windings and being responsive to the condition of said gate controlling means and said control potential producing amplifier means for selectively disabling one of said gating means, whereby a magnetized rotor disposed in the path of said magnetic fields may be driven towards alignment with said resultant field and retarded in its advance by the component magnetic field.

References Cited

UNITED STATES PATENTS

| | | | |
|---|---|---|---|
| 3,239,738 | 3/1966 | Welch | 318—138 |
| 3,345,547 | 10/1967 | Dunne | 318—138 |
| 3,386,018 | 5/1968 | Vaniz | 318—138 |

ORIS L. RADER, Primary Examiner

G. R. SIMMONS, Assistant Examiner

U.S. Cl. X.R.

310—49